United States Patent
Sato et al.

(10) Patent No.: US 10,054,742 B2
(45) Date of Patent: Aug. 21, 2018

(54) OPTICAL FIBER FUSION SPLICER AND OPTICAL FIBER FUSION SPLICING METHOD

(71) Applicant: SEI Optifrontier Co., Ltd., Yokohama-shi, Kanagawa (JP)

(72) Inventors: Ryuichiro Sato, Chigasaki (JP); Toshihiko Homma, Chigasaki (JP)

(73) Assignee: SEI OPTIFRONTIER CO., LTD., Kanagawa (JP)

(*) Notice: Subject to any disclaimer, the term of this patent is extended or adjusted under 35 U.S.C. 154(b) by 247 days.

(21) Appl. No.: 15/004,072

(22) Filed: Jan. 22, 2016

(65) Prior Publication Data

US 2016/0216448 A1    Jul. 28, 2016

(30) Foreign Application Priority Data

Jan. 23, 2015 (JP) ................... 2015-010993

(51) Int. Cl.
*G02B 6/255* (2006.01)
*G02B 21/00* (2006.01)
*G02B 21/36* (2006.01)

(52) U.S. Cl.
CPC ......... *G02B 6/2553* (2013.01); *G02B 6/2555* (2013.01); *G02B 21/0016* (2013.01); *G02B 21/365* (2013.01)

(58) Field of Classification Search
CPC ........ G02B 6/24; G02B 6/255; G02B 6/2551; G02B 6/2553; G02B 6/2555; G02B 21/0016; G02B 21/365
See application file for complete search history.

(56) References Cited

U.S. PATENT DOCUMENTS 6,966,708 B2 * 11/2005 Hattori ................. G02B 6/2551
  385/95
8,317,412 B2 * 11/2012 Huang ................. G02B 6/2555
  385/95

FOREIGN PATENT DOCUMENTS

| JP | S62-198804 | 9/1987 | |
| JP | H2-37306 | 2/1990 | |
| JP | H8-340473 | 12/1996 | |
| JP | 11258450 A * | 9/1999 | ........... G02B 6/2551 |
| JP | H11-326681 | 11/1999 | |
| JP | 2000-205997 | 7/2000 | |
| JP | 2000-275469 | 10/2000 | |
| JP | 2002-169050 | 6/2002 | |
| JP | 2003-195093 | 7/2003 | |
| JP | 2005-099362 | 4/2005 | |

(Continued)

*Primary Examiner* — Michael A Tolin
(74) *Attorney, Agent, or Firm* — Smith, Gambrell & Russel, LLP.

(57) ABSTRACT

An optical fiber fusion splicer disclosed. The optical fiber fusion splicer includes: a first microscope configured to observe first and second optical fibers from a first direction by receiving light emitted from a first light source; a second microscope configured to observe the first and second optical fibers from a second direction by receiving light emitted from a second light source, the second direction crossing the first direction; a fusion splicing mechanism configured to fusion-splice an end portion of the first optical fiber and an end portion of the second optical fiber; and a control unit configured to control the fusion splicing mechanism. The first microscope is movable in the first direction. The second microscope is secured to not move in the second direction.

10 Claims, 9 Drawing Sheets

(56) References Cited

FOREIGN PATENT DOCUMENTS

| | | | |
|---|---|---|---|
| JP | 2012-242599 | 12/2012 | |
| JP | 2014-123157 | 7/2014 | |
| WO | WO-2014121266 A1 * | 8/2014 | ........... G02B 6/2551 |

* cited by examiner

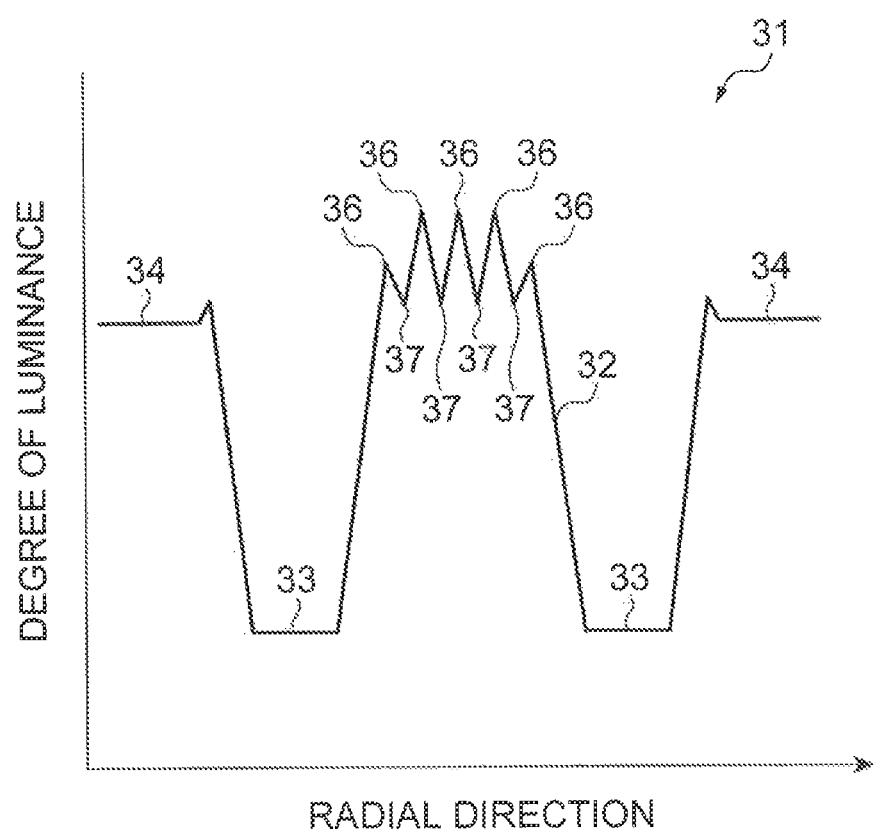

OPTICAL FIBER FUSION SPLICER AND OPTICAL FIBER FUSION SPLICING METHOD

TECHNICAL FIELD

The present invention relates to an optical fiber fusion splicer and an optical fiber fusion splicing method.

BACKGROUND

There is a fusion splicing method as a method of connecting an end portion of an optical fiber and an end portion of another optical fiber. JP 2002-169050 discloses a fusion splicer for fusion-splicing an end portion of an optical fiber and an end portion of another optical fiber. This fusion splicer includes a pair of microscopes that observe side surfaces of the optical fibers from different angles. These microscopes are designed to be movable, and can accurately observe the cores of the optical fibers.

SUMMARY

According to JP 2002-169050 mentioned above, the pair of microscopes move at different timings from each other, so that focus adjustment is conducted to observe the cores of the optical fibers. In this case, the operation time for fusion-splicing the optical fibers becomes longer. If stationary microscopes are used so as to shorten the operation time, the cores shift at the time of position adjustment of the optical fibers to each other, and the possibility of large splice loss becomes higher.

One aspect of the present invention aims to provide an optical fiber fusion splicer and an optical fiber fusion splicing method that can shorten the operation time for fusion-splicing optical fibers and suppress large splice loss.

An optical fiber fusion splicer according to one aspect of the present invention includes: a first microscope configured to observe first and second optical fibers from a first direction by receiving light emitted from a first light source; a second microscope configured to observe the first and second optical fibers from a second direction by receiving light emitted from a second light source, the second direction crossing the first direction; a fusion splicing mechanism configured to fusion-splice an end portion of the first optical fiber and an end portion of the second optical fiber; and a control unit configured to control the fusion splicing mechanism. In this optical fiber fusion splicer, the first microscope is movable in the first direction, and the second microscope is secured to not move (be immobile) in the second direction.

An optical fiber fusion splicing method using the above optical fiber fusion splicer according to another aspect of the present invention includes: observing the first and second optical fibers with the secured second microscope from the second direction; recognizing the center positions of the cores of the first and second optical fibers from observation results from the second microscope; when the center position of the core of the first optical fiber is unrecognized, detecting the center of the outer diameter of the first optical fiber; when the center position of the core of the second optical fiber is unrecognized, detecting the center of the outer diameter of the second optical fiber; and fusion-splicing the end portions of the first and second optical fibers after adjusting the positions of the first and second optical fibers to each other.

BRIEF DESCRIPTION OF THE DRAWINGS

FIG. 8 is a schematic diagram showing an example of a luminance distribution waveform in the radial direction of an optical fiber.

DETAILED DESCRIPTION

[Description of Embodiments]

Figure 1:
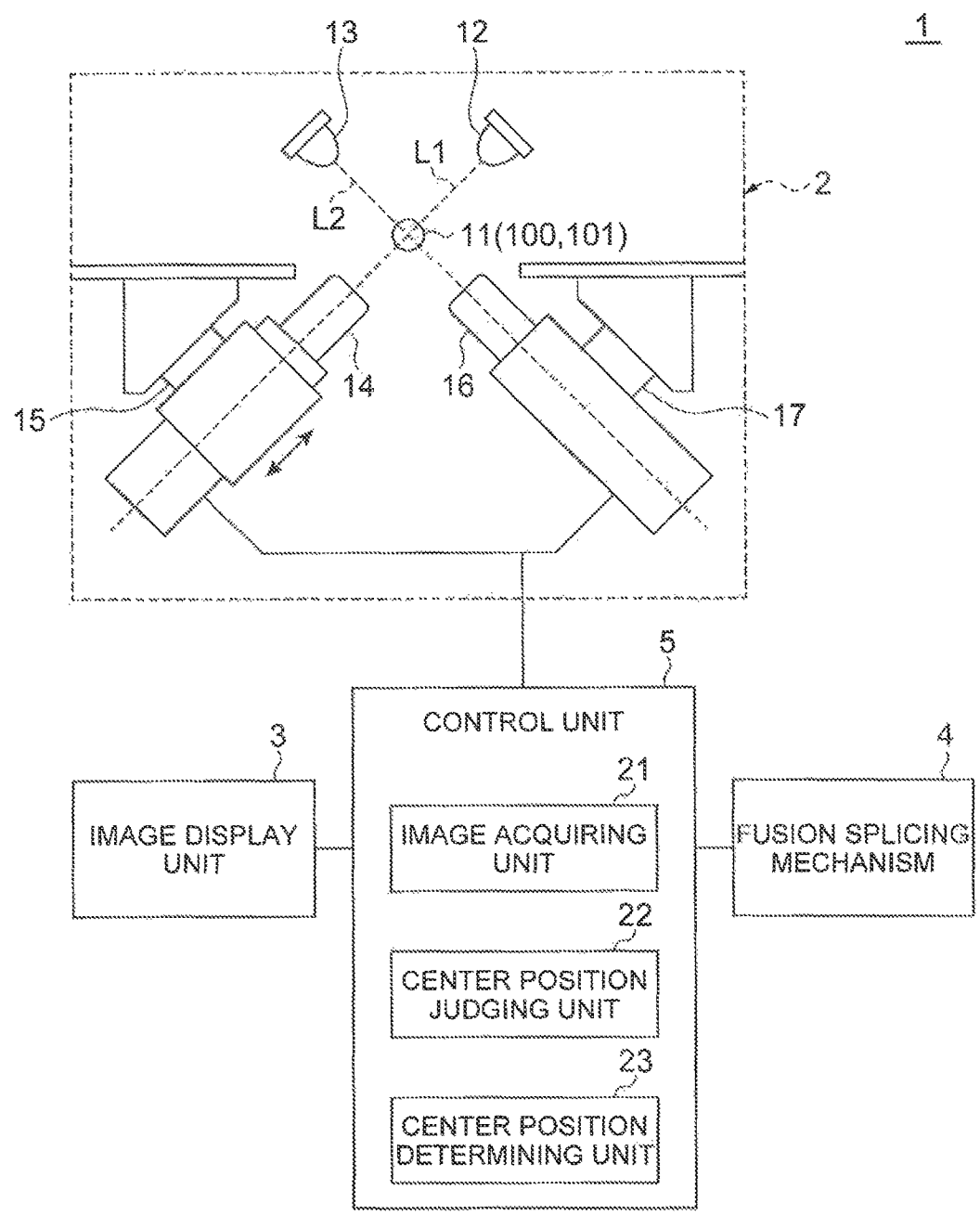
FIG. 1 is a schematic diagram showing the structure of a fusion splicer according to an embodiment.

First of all, embodiments of the invention of the subject application will be described as enumerated below.

An optical fiber fusion splicer according to an embodiment of the present invention includes: a first microscope configured to observe first and second optical fibers from a first direction by receiving light emitted from a first light source; a second microscope configured to observe the first and second optical fibers from a second direction by receiving light emitted from a second light source, the second direction crossing the first direction; a fusion splicing mechanism configured to fusion-splice an end portion of the first optical fiber and an end portion of the second optical fiber; and a control unit configured to control the fusion splicing mechanism. In this optical fiber fusion splicer, the first microscope is movable in the first direction, and the second microscope is secured to not move in the second direction.

In this optical fiber fusion splicer, the second microscope is secured to not move in the second axial direction. When the optical fiber fusion splicer fusion-splices the optical fibers, the first microscope performs focus adjustment with respect to the first and second optical fibers, but the second microscope does not perform focus adjustment with respect to the first and second optical fibers. Accordingly, the time for the second microscope to perform focus adjustment becomes unnecessary, and the operation time for fusion-splicing the first and second optical fibers can be shortened. Also, the first microscope can accurately observe the centers of the cores of the first and second optical fibers by performing focus adjustment with respect to the first and second optical fibers. Accordingly, when the first and second optical fibers are fusion-spliced, large splice loss can be suppressed more effectively than in a case where both the first microscope and the second microscope are secured.

When a center position of a core of the first optical fiber is unrecognized from an observation result from the second microscope, the control unit may detect the center of the outer diameter of the first optical fiber. Since the second microscope is secured, the second microscope cannot perform focus adjustment in accordance with the diameter, the type, or the like of the first and second optical fibers. Therefore, the second microscope could not observe the center position of the core of the first optical fiber in some cases. In this case, the control unit uses the detection results from the center of the outer diameter of the first optical fibers, so that the possibility that the center positions of the cores of the first and second optical fibers greatly shift at the time of fusion splicing becomes lower, and large splice loss due to fusion splicing can be more effectively suppressed.

When a center position of a core of the second optical fiber is unrecognized from the observation result from the second microscope, the control unit may detect the center of the outer diameter of the second optical fiber. Since the second microscope is secured, the second microscope cannot perform focus adjustment in accordance with the diameter, the type, or the like of the first and second optical fibers. Therefore, the second microscope could not observe the center position of the core of the second optical fiber in some cases. In this case, the control unit uses the detection results from the center of the outer diameter of the second optical fibers, so that the possibility that the center positions of the cores of the first and second optical fibers greatly shift at the time of fusion splicing becomes lower, and large splice loss due to fusion splicing can be more effectively suppressed.

The control unit may include an image acquiring unit that acquires a first image and second image, the first image being captured by the first microscope and the second image captured by the first second microscope. If the center position of the core of the first optical fiber is unrecognized from the second image, the control unit may detect the center of the outer diameter of the first optical fiber from the second image. In this case, the control unit regards the center of the outer diameter of the first optical fiber detected from the second image that is captured the second microscope and is acquired by the image acquiring unit, as the center position of the core. Accordingly, the possibility that the center positions of the cores of the first and second optical fibers greatly shift at the time of fusion splicing becomes lower, and large splice loss due to fusion splicing can be even more effectively suppressed.

Furthermore, if the center position of the core of the second optical fiber is unrecognized from the second image, the control unit may detect the center of the outer diameter of the second optical fiber from the second image. In this case, the control unit regards the center of the outer diameter of the second optical fiber detected from the second image that is captured the second microscope and is acquired by the image acquiring unit, as the center position of the core.

Accordingly, the possibility that the center positions of the cores of the first and second optical fibers greatly shift at the time of fusion splicing becomes lower, and large splice loss due to fusion splicing can be even more effectively suppressed.

The control unit may further include: a center position judging unit configured to judge whether the center position of the core of the first optical fiber is recognized from the first image and the second image; and a center position determining unit configured to determine the center position of the core of the first optical fibers. After it is determined that the center position of the core of the first optical fiber is recognized, the center position of the core of the first optical fiber is determined. In this manner, the center position of the core of the first optical fiber can be more accurately determined.

The center position judging unit may be configured to judge whether the center position of the core of the second optical fiber is recognized from the first image and the second image, and the center position determining unit may be configured to determine the center position of the core of the second optical fibers. After it is determined that the center position of the core of the second optical fiber is recognized, the center position of the core of the second optical fiber is determined. In this manner, the center position of the core of the second optical fiber can be more accurately determined.

If the center position judging unit judges that the recognized center position of the core of the first optical fiber is a wrong position, the center position determining unit may detect the center of the outer diameter of the first optical fiber from the second image. In such a case, the center of the outer diameter of the first optical fiber is regarded as the center position of the core, so that the possibility that the center positions of the cores of the first and second optical fibers greatly shift at the time of fusion splicing becomes lower. Accordingly, large splice loss due to fusion splicing can be even more effectively suppressed.

If the center position judging unit judges that the recognized center position of the core of the second optical fiber is a wrong position, the center position determining unit may detect the center of the outer diameter of the second optical fiber from the second image. In such a case, the center of the outer diameter of the second optical fiber is regarded as the center position of the core, so that the possibility that the center positions of the cores of the first and second optical fibers greatly shift at the time of fusion splicing becomes lower. Accordingly, large splice loss due to fusion splicing can be even more effectively suppressed.

Another embodiment of the present invention is an optical fiber fusion splicing method that uses the above optical fiber fusion splicer, and includes: observing the first and second optical fibers with the secured second microscope from the second direction; recognizing the center positions of the cores of the first and second optical fibers from observation results from the second microscope; when the center position of the core of the first optical fiber is unrecognized, detecting the center of the outer diameter of the first optical fiber; when the center position of the core of the second optical fiber is unrecognized, detecting the center of the outer diameter of the second optical fiber; and fusion-splicing the end portions of the first and second optical fibers after adjusting the positions of the first and second optical fibers to each other.

By this optical fiber fusion splicing method, the first microscope performs focus adjustment with respect to the optical fibers, but the secured second microscope does not perform focus adjustment with respect to the optical fibers. As a result, the time for the second microscope to perform focus adjustment becomes unnecessary. Accordingly, the operation time for fusion-splicing the optical fibers can he shortened. Also, if at least the one center position of the cores of the first and second optical fibers is unrecognized from the observation results from the second microscope, one or both of the centers of the outer diameters of the first and second optical fibers are detected, so that the possibility that the center positions of the cores of the first and second optical fibers greatly shift at the time of fusion splicing becomes lower, and large splice loss due to fusion splicing can be suppressed.

[Details of Embodiments]

Specific examples of the optical fiber fusion splicer and the optical fiber fusion splicing method according to embodiments of the present invention will be described below with reference to the accompanying drawings. It should be noted that the present invention is not limited to these examples but shown in the claims, and it is intended that all modifications that come within the meaning and range of equivalence to the claims should be embraced herein. In the description, the same elements or elements having the same function are denoted with the same reference signs, and an overlapping description will be omitted.

FIG. 1 is a schematic diagram showing the structure of a fusion splicer according to an embodiment. As shown in FIG. 1, an optical fiber fusion splicer 1 for fusion-splicing optical fibers includes: an image observing mechanism 2 that observes a pair of optical fibers 100 and 101 (first and second optical fibers); an image display unit 3 that displays an image of the optical fibers 100 and 101 observed by the image observing mechanism 2; a fusion splicing mechanism 4 that fusion-splices an end portion of the optical fiber 100 and an end portion of the optical fiber 101; and a control unit 5 that controls the image observing mechanism 2, the image display unit 3, and the fusion splicing mechanism 4. The control unit 5 is connected to the image observing mechanism 2, the image display unit 3, and the fusion splicing mechanism 4.

The image observing mechanism 2 includes: a placement unit 11 in which the optical fibers 100 and 101 are placed; a first light source 12 and a second light source 13 that emit light toward the optical fibers 100 and 101; a first microscope 14 that faces the first light source 12 via the placement unit 11; a focus drive unit 15 that can drive the first microscope 14; a second microscope 16 that faces the second light source 13 via the placement unit 11; and a securing unit 17 that secures the second microscope 16.

The first light source 12 and the second light source 13 are light-emitting elements such as light-emitting diodes. The first light source 12 and the second light source 13 emit red light, for example.

The first microscope 14 is a member that observes side surfaces of the optical fibers 100 and 101 (particularly the centers of the cores of the optical fibers 100 and 101, and the outer diameters of the optical fibers 100 and 101) by receiving light emitted from the first light source 12. The first microscope 14 is a CCD (Charge-Coupled Device) camera, a CMOS (Complementary Metal Oxide Semiconductor) camera, or the like. The first microscope 14 can be moved by the above mentioned focus drive unit 15 so that the optical fibers 100 and 101 placed on the placement unit 11 can be accurately observed. Observation results from the first microscope 14 can be captured as images, and these images (hereinafter referred to as the observation results or a first image) are transmitted as data to the control unit 5.

The second microscope 16 is a member that observes side surfaces of the optical fibers 100 and 101 (particularly the centers of the cores of the optical fibers 100 and 101, and the outer diameters of the optical fibers 100 and 101) by receiving light emitted from the second light source 13. The second microscope 16 is a CCD camera, a CMOS camera, or the like. The second microscope 16 is secured by the above mentioned securing unit 17 to not move (be immobile). Observation results from the second microscope 16 can be captured as images, and these images (hereinafter referred to as the observation results or a second image) are transmitted as data to the control unit 5.

In the description below, the axial direction of light to be emitted from the first light source 12 toward the first microscope 14 will be referred to as the first axial direction L1 (first direction), and the axial direction of light to be emitted from the second light source 13 toward the second microscope 16 will be referred to as the second axial direction L2 (second direction). The first light source 12, the second light source 13, the first microscope 14, and the second microscope 16 are respectively arranged so that the first axial direction L1 and the second axial direction L2 cross each other on the placement unit 11. Therefore, the first microscope 14 and the second microscope 16 are each installed so as to observe the optical fibers 100 and 101 from different directions (angles). The angle between the first axial direction L1 and the second axial direction L2 is 60 to 120 degrees, for example.

The image display unit 3 displays respective results of observation conducted by the first microscope 14 and the second microscope 16, and the like. Various displays (such as a liquid crystal display) can be used as the image display unit 3.

The fusion splicing mechanism 4 is a mechanism that performs fusion splicing by causing electric discharge between the butted end portions of the optical fibers 100 and 101. The fusion splicing mechanism 4 positions the optical fibers 100 and 101 by moving the placement unit 11, for example.

The control unit 5 includes: an image acquiring unit 21 that acquires a captured image from the image observing mechanism 2; a center position judging unit 22 that judges whether the center positions of the cores of the optical fibers can be recognized from the image acquired by the image acquiring unit 21; and a center position determining unit 23 that determines the center positions of the cores of the optical fibers. The control unit 5 may be a CPU (Central Processing Unit) formed with one or more integrated circuits (ICs), for example.

The image acquiring unit 21 acquires respective images (observation results) of the optical fibers 100 and 101 captured by the first microscope 14 and the second microscope 16 in the image observing mechanism 2. The image acquiring unit 21 also detects luminance distribution waveforms in the acquired images.

The center position judging unit 22 judges whether the center positions of the respective cores of the optical fibers 100 and 101 can be recognized from the first image captured by the first microscope 14 and the second image captured by the second microscope 16. The center position judging unit 22 judges whether the center positions of the cores of the optical fibers 100 and 101 observed from the first axial direction L1 can be recognized with the use of the luminance distribution waveforms in the first image acquired by the image acquiring unit 21 (captured by the first microscope 14), for example. Likewise, the center position judging unit 22 judges whether the center positions of the cores of the optical fibers 100 and 101 observed from the second axial direction L2 can be recognized with the use of the luminance distribution waveforms in the second image acquired by the image acquiring unit 21 (captured by the second microscope 16). The judgement to be made by the center position judging unit 22 will be described later in detail.

The center position determining unit 23 determines the center positions of the respective cores of the optical fibers 100 and 101. The center position determining unit 23 determines the center positions of the respective cores of the optical fibers 100 and 101 observed from the first axial direction L1, using the luminance distribution waveforms in the first image, for example. Likewise, the center position determining unit 23 determines the center positions of the respective cores of the optical fibers 100 and 101 observed from the second axial direction L2, using the luminance distribution waveforms in the second image. The method to be implemented by the center position determining unit 23 to determine the center positions of the cores of the optical fibers 100 and 101 will be described later in detail. If at least the one center position of the cores of the optical fibers 100 and 101 cannot be recognized by the center position judging unit 22, the center position determining unit 23 detects the outer diameter(s) of the optical fiber(s) 100 and/or 101 with unrecognized core center position(s). The center(s) of the detected outer diameter(s) of the optical fiber(s) 100 and/or 101 is/are regarded as the center position(s) of the corresponding core(s).

Figure 2:
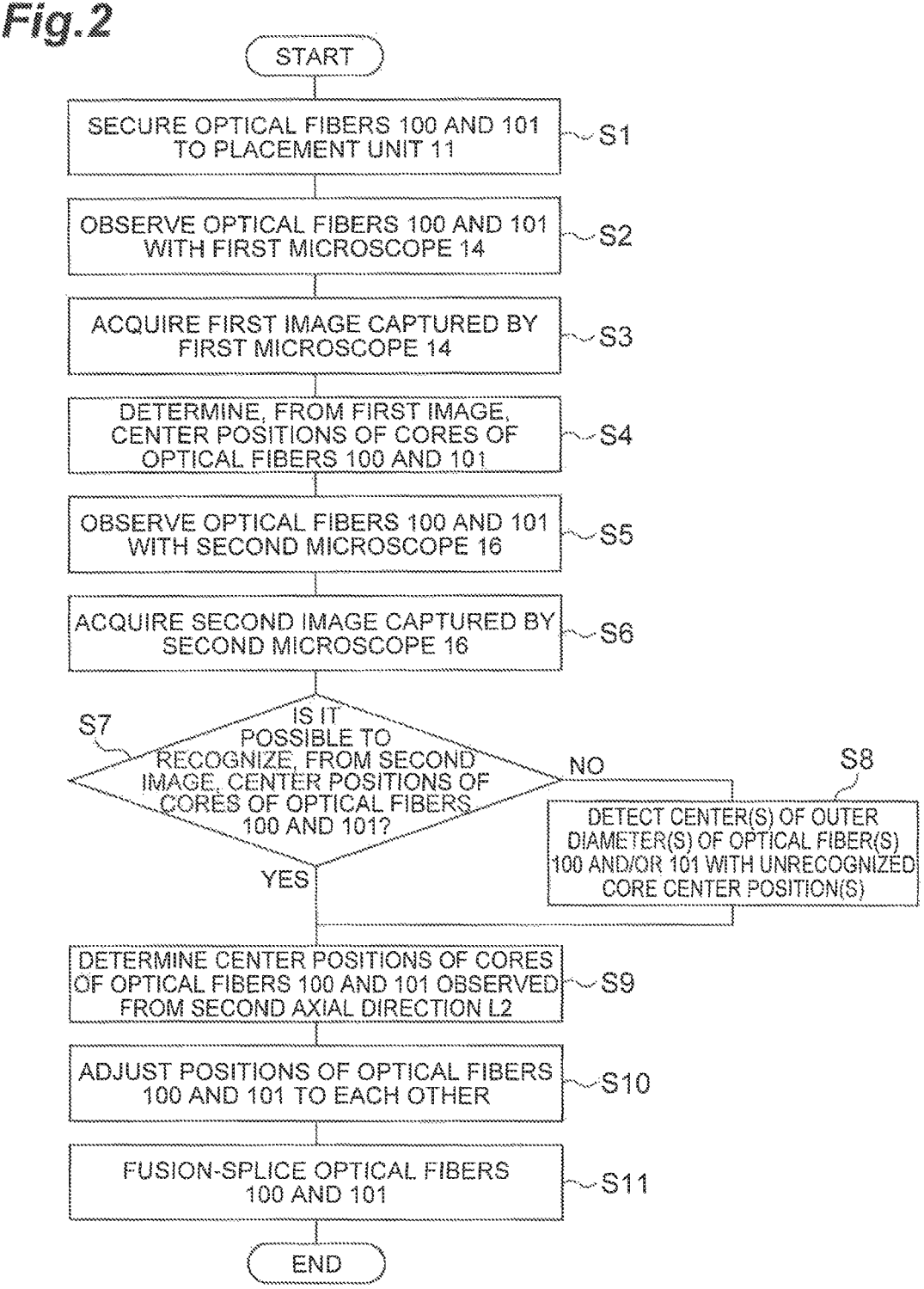
FIG. 2 is a flowchart for explaining an optical fiber fusion splicing method according to the embodiment.

Referring now to FIG. 2, an optical fiber fusion splicing method using the optical fiber fusion splicer according to this embodiment is described. FIG. 2 is a flowchart for explaining an optical fiber fusion splicing method according to this embodiment.

As shown in FIG. 2, in a first step, the optical fibers 100 and 101 are secured to the placement unit 11 (step S1). In step S1, the optical fibers 100 and 101 are secured to the placement unit 11 so that an end portion of the optical fiber 100 and an end portion of the optical fiber 101 face each other.

Next, in a second step, the first microscope 14 having received light from the first light source 12 observes the optical fibers 100 and 101 from the first axial direction L1 (step S2). In step S2, the focus drive unit 15 adjusts the focal position of the first microscope 14 so that the center positions of the cores of the optical fibers 100 and 101 can be observed by the first microscope 14.

In a third step, the image acquiring unit 21 acquires the first image captured by the first microscope 14 (step S3). In step S3, the image acquiring unit 21 detects luminance distribution waveforms in the radial direction of the optical fibers 100 and 101 from the first image.

In a fourth step, from the acquired first image, the center position determining unit 23 determines the center positions of the respective cores of the optical fibers 100 and 101 observed from the first axial direction L1 (step S4). In step S4, after the center position judging unit 22 recognizes the center positions of the cores of the optical fibers 100 and 101 observed from the first axial direction L1, the center position determining unit 23 determines the center positions of the cores of the optical fibers 100 and 101 by using the luminance distribution waveforms in the first image.

Figure 3:
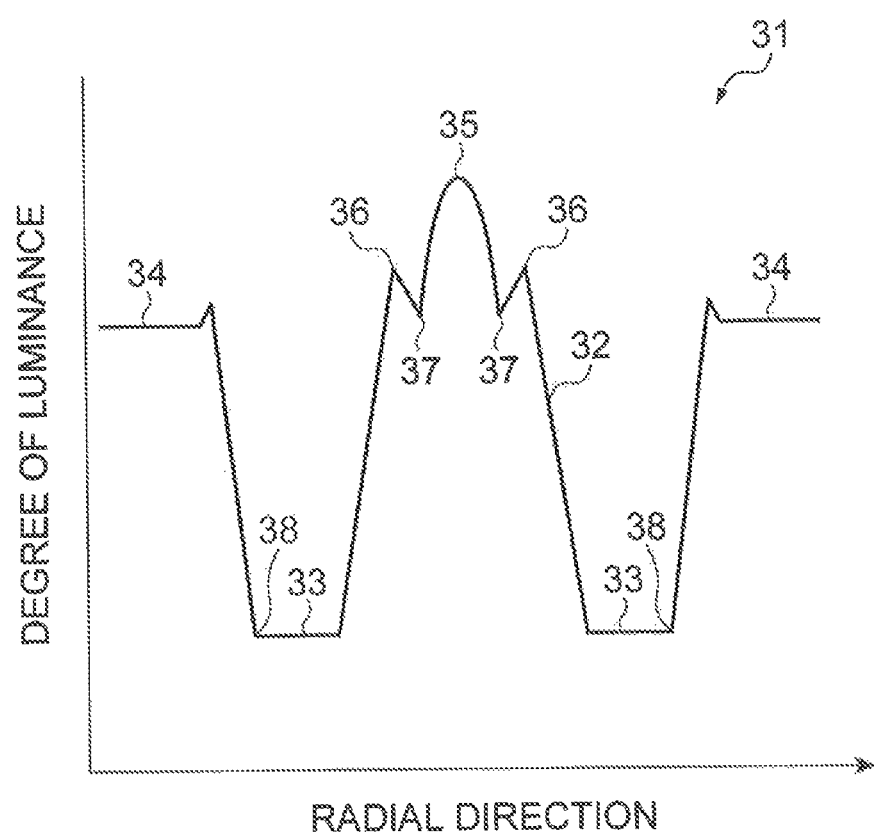
FIG. 3 is a schematic diagram showing an example of a luminance distribution waveform in the radial direction of an optical fiber.

Referring now to FIG. 3, the luminance distribution waveforms in the first image acquired by the image acquiring unit 21, and the method of determining the center positions of the cores of the optical fibers using the luminance distribution waveform are described. FIG. 3 is a schematic diagram showing an example of a luminance distribution waveform in the radial direction of an optical fiber. In FIG. 3, the vertical axis indicates the degree of luminance, and the horizontal axis indicates the radial direction of the optical fiber, in the luminance distribution waveform 31 shown in FIG. 3, a bright portion 32 is formed in a center portion in the radial direction, and dark portions 33 are formed on both sides of the bright portion 32 in the radial direction. The bright portion 32 and the dark portions 33 are formed due to a difference in transmittance between the materials forming the optical fiber. In the bright portion 32, there is a peak 35 in a center portion in the radial direction, and there are peaks 36 on both sides of the peak 35 in the radial direction. The difference in intensity between the peaks 35 and 36 is caused by the difference in refractive index between the core and the clad of the optical fiber. Bright portions 34 formed on the opposite sides of the respective dark portions 33 from the bright portion 32 in the radial direction indicate the degree of luminance outside the optical fiber (the background luminance).

The center position determining unit 23 may determine the position with the highest intensity in the luminance distribution waveform 31 in the radial direction to be the center position of the core of the optical fiber. The center position determining unit 23 may set a predetermined threshold value for degrees of luminance, recognize the two positions with the predetermined threshold value in the luminance distribution waveform 31 in the radial direction, and determine the center point between the two positions to be the center position of the core of the optical fiber. Alternatively, the center position determining unit 23 may recognize the two positions with the minimum value in the bright portion 32 in the luminance distribution waveform 31 in the radial direction (the minimum value points 37 between the peak 35 and the peaks 36), and determine the center point between the two minimum value points 37 to be the center position of the core.

Referring back to FIG. 2, in a fifth step, the second microscope 16 having received light from the second light source 13 observes the optical fibers 100 and 101 from the second axial direction L2 (step S5). In step S5, the focal position of the second microscope 16 is not adjusted, since the second microscope 16 is secured by the securing unit 17.

In a sixth step, the image acquiring unit 21 acquires the second image captured by the second microscope 16 (step S6). In step S6, the image acquiring unit 21 detects luminance distribution waveforms in the radial direction of the optical fibers 100 and 101 from the second image captured by the second microscope 16.

In a seventh step, the center position judging unit 22 judges whether the center positions of the cores of the optical fibers 100 and 101 observed from the second axial direction L2 can be recognized from the second image captured by the second microscope 16 (step S7). If the center position judging unit 22 cannot recognize at least one of the center positions of the cores of the optical fibers 100 and 101 in step S7 (NO in step S7), the center position determining unit 23 in an eighth step detects the center(s) of the outer diameter(s) of the optical fiber(s) 100 and/or 101 of which core center position(s) could not be recognized from the second image acquired by the image acquiring unit 21 (step S8).

A case where the center position judging unit 22 cannot recognize at least the one center position of the cores of the optical fibers 100 and 101 observed from the second axial direction L2 means a case where one or both of the cores of the optical fibers 100 and 101 cannot be observed as the second microscope 16 fails to come into focus, for example. This might occur, because the second microscope 16 is secured by the securing unit 17, and cannot perform focus adjustment in accordance with the diameter, the type, or the like of the optical fibers 100 and 101. The center of the outer diameter of an optical fiber can be detected with the use of the luminance distribution waveform shown in FIG. 3, for example. Specifically, in FIG. 3, the inflection points 38 between the dark portions 33 and the bright portions 34 indicate the outer diameter of the optical fiber. Accordingly, the center position determining unit 23 detects the center point between the inflection points 38 as the center of the outer diameter of the optical fiber.

Referring back to FIG. 2, if the center position judging unit 22 can recognize the center positions of the cores of the optical fibers 100 and 101 observed from the second axial direction L2 in step S7 (YES in step S7), the center position determining unit 23 determines the center positions of the cores of the optical fibers 100 and 101 observed from the second axial direction L2 (step S9). Alternatively, after step S8 is carried out, step S9 is carried out. If the result of step S7 is "YES", the center positions of the cores of the optical fibers 100 and 101 are determined in the same manner as in step S4. If the result of step S7 is "NO", on the other hand, the center position determining unit 23 regards the centers (detected in step S8) of the outer diameters of the optical fibers 100 and 101 with unrecognized core center positions, as the center positions of the cores.

In a tenth step, positioning of the optical fibers 100 and 101 is performed with the use of the center positions of the optical fibers 100 and 101 determined in steps S4 and S9 (step S10). In step S10, the center positions that are of the cores of the optical fibers 100 and 101 observed from the first axial direction L1 and are obtained through steps Si to S4 are adjusted to each other, and the center positions that are of the cores of the optical fibers 100 and 101 observed from the second axial direction L2 and are obtained through steps S5 to S9 are adjusted to each other.

In an eleventh step, the fusion splicing mechanism 4 fusion-splices the end portions of the optical fibers 100 and 101 through butt discharge (step S11).

The effects to be achieved with the optical fiber fusion splicer 1 according to the above described embodiment are now described. In the optical fiber fusion splicer 1 according to this embodiment, the second microscope 16 is secured to not move in the second axial direction L2. When the optical fiber fusion splicer 1 fusion-splices the optical fibers 100 and 101, the first microscope 14 performs focus adjustment with respect to the optical fibers 100 and 101, but the second microscope 16 does not perform focus adjustment with respect to the optical fibers 100 and 101. Accordingly, the time for the second microscope 16 to perform focus adjustment becomes unnecessary, and the operation time for fusion-splicing the optical fibers 100 and 101 can be shortened. Also, the first microscope 14 can accurately observe the centers of the cores of the optical fibers 100 and 101 by performing focus adjustment with respect to the optical fibers 100 and 101. Accordingly, when the optical fibers 100 and 101 are fusion-spliced, large splice loss can be suppressed more effectively than in a case where both the first microscope 14 and the second microscope 16 are secured.

In a case where at least the one center position of the cores of the optical fibers 100 and 101 is unrecognized from observation results from the second microscope 16, the control unit 5 may detect the centers of the outer diameters of the optical fibers 100 and 101 with unrecognized core center positions. Since the second microscope 16 is secured, the second microscope 16 cannot perform focus adjustment in accordance with the diameter, the type, or the like of the optical fibers 100 and 101. There the second microscope 16 cannot observe the center positions of the cores of the optical fibers 100 and 101 in some cases, in such cases, the centers (detected by the control unit 5) of the outer diameters of the optical fibers 100 and 101 with unrecognized core center positions are regarded as the center positions of the cores. Accordingly; the possibility that the center positions of the cores of the optical fibers 100 and 101 greatly shift at the time of fusion splicing becomes lower, and large splice loss due to fusion splicing can be more effectively suppressed.

The control unit 5 may include the image acquiring unit 21 that acquires respective images captured by the first microscope 14 and the second microscope 16. If at least the one center position of the cores of the optical fibers 100 and 101 is unrecognized from the image captured by the second microscope 16, the control unit 5 may detect the centers of the outer diameters of the optical fibers 100 and 101 with unrecognized core center positions. In this case, the control unit 5 regards one or both of the centers of the outer diameters of the optical fibers 100 and 101 detected from the image that is captured by the second microscope 16 and is acquired by the image acquiring unit 21, as the center positions of the cores. Accordingly, large splice loss due to fusion splicing can be more effectively suppressed.

The control unit 5 may further include: the center position judging unit 22 that judges whether the center positions of the cores of the optical fibers 100 and 101 are recognized from the image captured by the first microscope 14 and the image captured by the second microscope 16; and the center position determining unit 23 that determines the center positions of the cores of the optical fibers 100 and 101. After it is determined that the center positions of the cores of the optical fibers 100 and 101 are recognized, the center positions of the cores of the optical fibers 100 and 101 are determined. In this manner, the center positions of the cores of the optical fibers 100 and 101 can be more accurately determined.

In the description below, an optical fiber fusion splicing method according to a modification of the above described embodiment will be explained. In the description of the modification, the same explanations as those of the above embodiment will not be repeated, and different aspects from the above embodiment will be explained.

Figure 4:
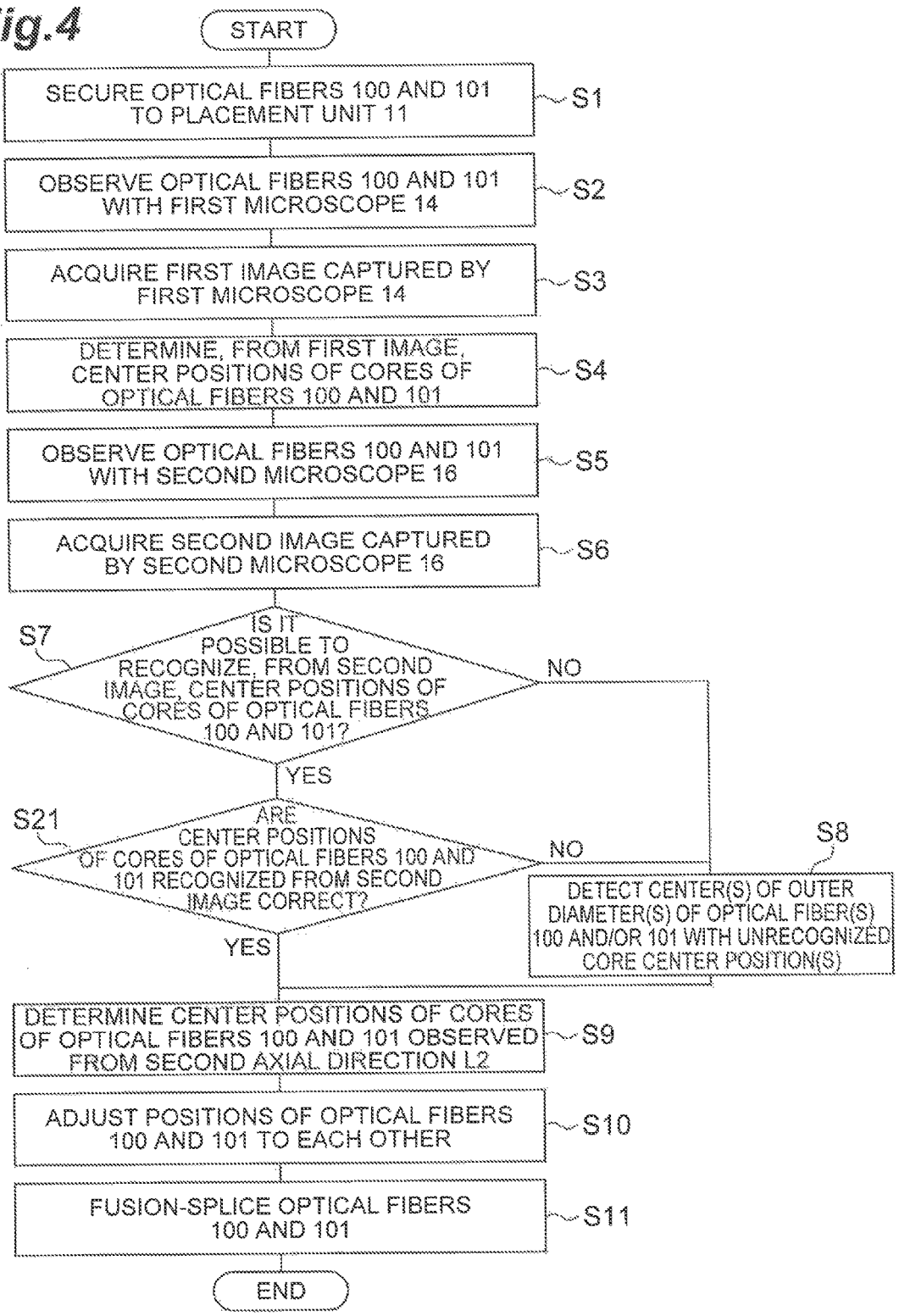
FIG. 4 is a flowchart for explaining an optical fiber fusion splicing method according to a modification of the embodiment.

FIG. 4 is a flowchart for explaining an optical fiber fusion splicing method according to a modification of this embodiment. As shown in FIG. 4, in this modification, if the center position judging unit 22 judges that the center positions of the optical fibers 100 and 101 can he recognized in step S7 (YES in step S7), step S21 is carried out prior to step S9.

In step S21, the center position judging unit 22 judges whether the center positions that are of the cores of the optical fibers 100 and 101 observed from the second axial direction L2 and are recognized from the second image are the correct positions. If the center position judging unit 22 in step S21 judges that the recognized center positions of the cores of the optical fibers 100 and 101 are the correct positions (YES in step S21), the center position determining unit 23 determines the recognized center positions of the cores of the optical fibers 100 and 101 to be the correct positions (step S9). If the center position judging unit 22 in step S21 judges that the recognized center positions of the cores of the optical fibers 100 and 101 are wrong positions (NO in step S21), the center positions of the cores of the optical fibers 100 and 101 whose core center positions have been determined to be wrong positions are regarded as unrecognized. The center position determining unit 23 in step S8 detects the center(s) of the outer diameter(s) of the optical fiber(s) 100 and/or 101 whose core center position(s) has/have been determined to be wrong positions. In step S9, the centers of the outer diameters of the optical fibers 100 and 101 detected in step S8 are regarded as the center positions of the cores.

Referring now to FIGS. 5 through 9B, example cases where recognized center positions of the cores of the optical fibers 100 and 101 are wrong positions are described. FIGS. 5 through 9B are schematic diagrams each showing another example of a luminance distribution waveform in the radial direction of an optical fiber. In FIGS. 5 through 9B, the vertical axis indicates the degree of luminance, and the horizontal axis indicates the radial direction of the optical fiber, as in FIG. 3.

Figure 5:
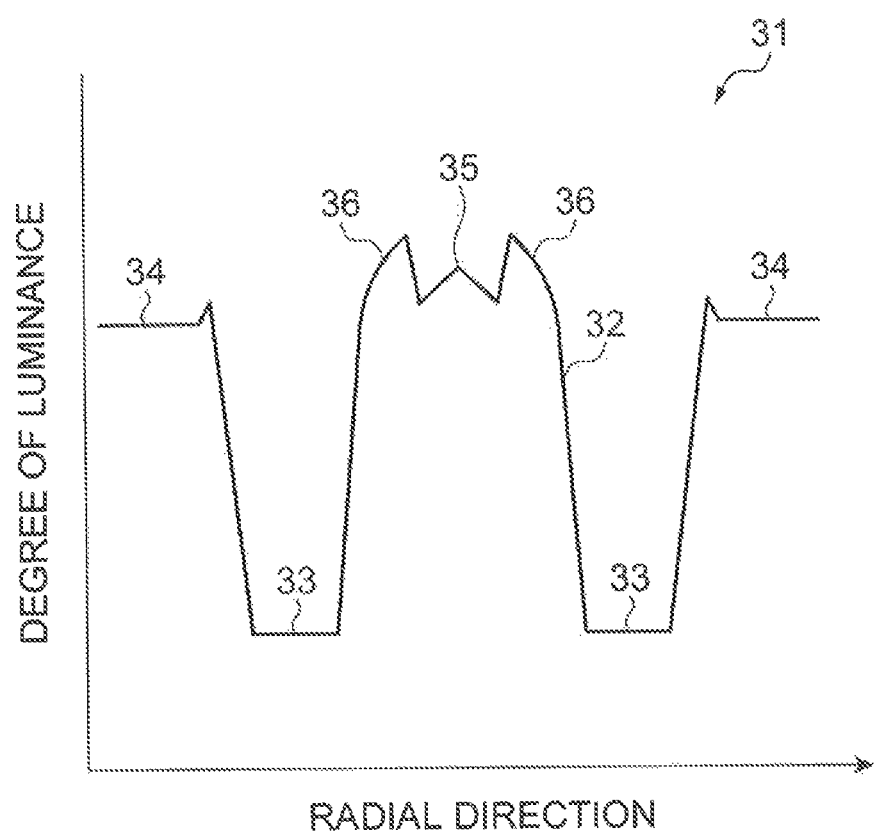
FIG. 5 is a schematic diagram showing an example of a luminance distribution waveform in the radial direction of an optical fiber.

In a case where the center position determining unit 23 determines the position with the highest intensity in a luminance distribution waveform to be the center position of the core of an optical fiber, the center position judging unit 22 detects the positions of respective peaks, the intensities at the respective peaks, the number of the peaks, and the like in the luminance distribution waveform. As shown in FIG. 5, in a case where the position with the highest intensity in the radial direction in the luminance distribution waveform 31 is determined not to be a peak 35 which is located at neighborhood of the center position of the bright portion 32, for example, the center position judging unit 22 judges that the recognized center positions of the cores of the optical fibers 100 and 101 are wrong positions.

Figure 6:
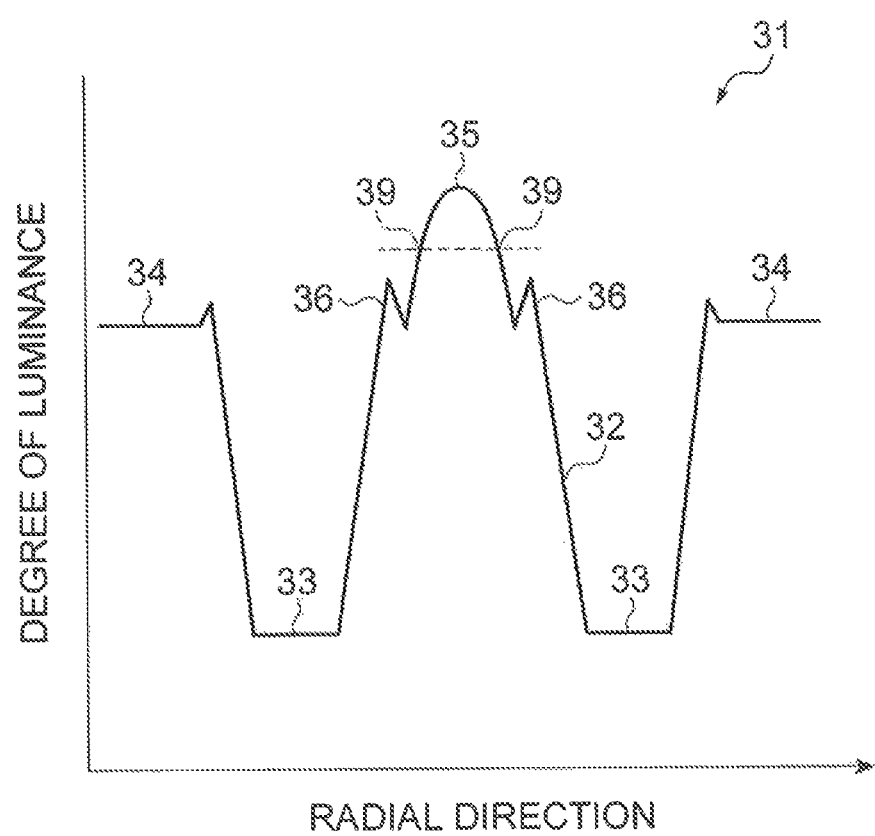
FIG. 6 is a schematic diagram showing an example of a luminance distribution waveform in the radial direction of an optical fiber.

In a case where the center position determining unit 23 sets a predetermined threshold value for degrees of luminance, recognizes the two positions with the predetermined threshold value in the radial direction in an acquired luminance distribution waveform, and determines the center point between the two positions to be the center position of the core of an optical fiber, the center position judging unit 22 detects the luminance distribution between the two positions with the predetermined threshold value in the radial direction. As shown in FIG. 6, in a case where the luminance distribution between the two positions 39 with the predetermined threshold value in the luminance distribution waveform 31 are determined to asymmetric, for example, the center position judging unit 22 judges that the recognized center positions of the cores of the optical fibers 100 and 101 are wrong positions.

Figure 7:
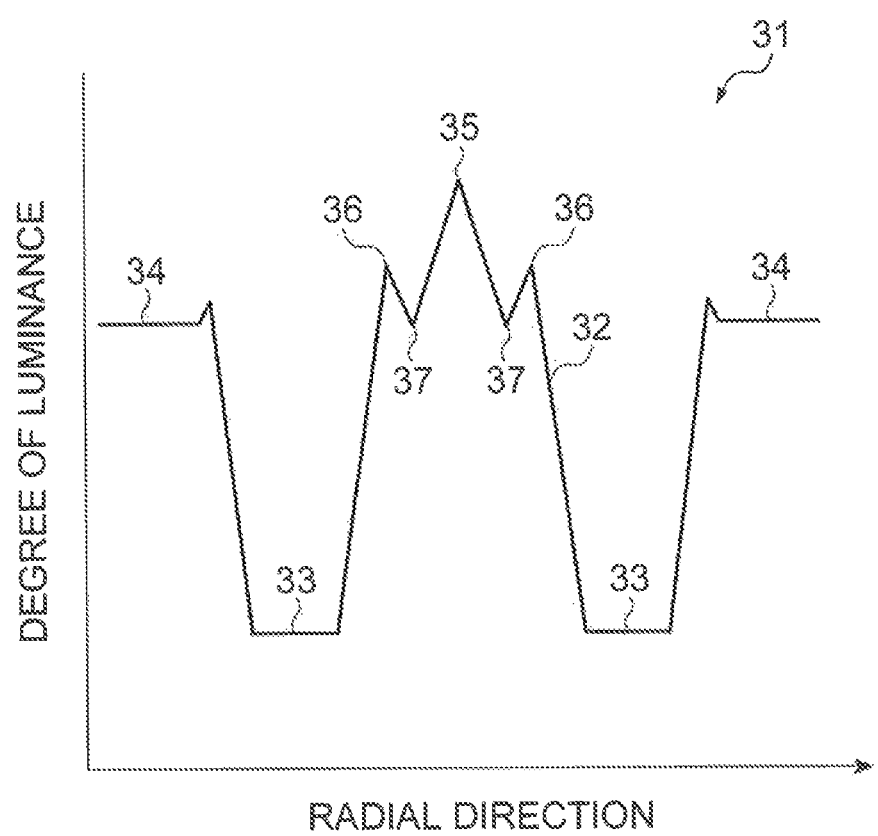
FIG. 7 is a schematic diagram showing an example of a luminance distribution waveform in the radial direction of an optical fiber.
Figure 9A:
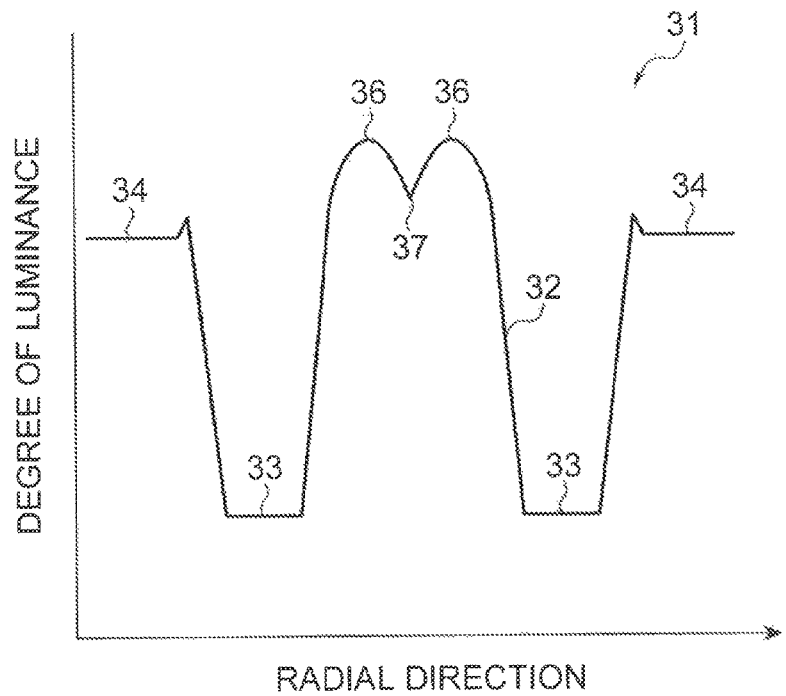
FIGS. 9A and 9B are schematic diagrams each showing an example of a luminance distribution waveform in the radial direction of an optical fiber.
Figure 9B:
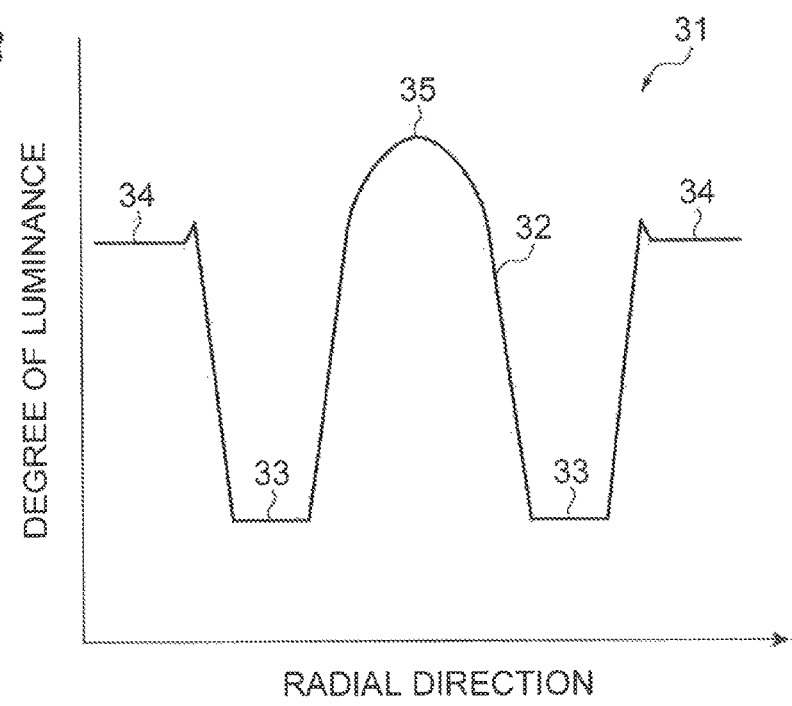

In a case where the center position determining unit 23 recognizes the two positions in the radial direction with the minimum value in the bright portion in a luminance distribution waveform, and determines the center point between the two minimum value points to be the center position of the core of an optical fiber, the center position judging unit 22 detects the luminance distribution between the two minimum value points. As shown in FIG. 7, in a case where the luminance distribution between the two minimum value points 37 in the luminance distribution waveform 31 are determined to asymmetric, for example, the center position judging unit 22 judges that the recognized center positions of the cores of the optical fibers 100 and 101 are wrong positions. Also, the center position judging unit 22 detects the number of the minimum value points in the bright portion. As shown in FIG. 8, in a case where three or more minimum value points 37 exist in the bright portion 32 in the luminance distribution waveform 31, for example, the center position judging unit 22 judges that the recognized center positions of the cores of the optical fibers 100 and 101 are wrong positions. As shown in FIGS. 9A and 9B, in cases where the number of minimum value points 37 in the bright portion 32 is one or less, the center position judging unit 22 also judges that the recognized center positions of the cores of the optical fibers 100 and 101 are wrong positions. In a case where the number of minimum value points in the bright portion 32 is one or less, the center position judging unit 22 may judge that the center positions of the optical fibers 100 and 101 cannot be recognized.

With the above described modifications of the embodiment, the same functions and effects as those of the embodiment can be achieved. In the modifications, if there is a possibility that the center positions of the cores of the optical fibers 100 and 101 determined by the center position determining unit 23 greatly differ from the actual positions, the centers of the outer diameters of the optical fibers 100 and 101 are regarded as the center positions of the cores. The possibility that the center positions of the cores of the optical fibers 100 and 101 greatly shift at the time of fusion splicing can be further lowered. Accordingly, large splice loss due to fusion splicing can be even more effectively suppressed.

The above described optical fiber fusion splicer and the optical fiber fusion splicing method using the optical fiber fusion splicer are not limited to the above described embodiment, and other various modifications may be made. For example, in the above described embodiment, steps S1 through S4 may be carried out after steps S5 through S9 are carried out. Also, the positions of the optical fibers 100 and 101 may be adjusted to each other after step S4, and step S5 and the later steps may then be carried out. In step S8, the center(s) of the outer diameter(s) of the optical fiber(s) 100 and/or 101 whose core center position(s) has/have been recognized in step S7 or S21 may be detected.

What is claimed is:

1. An optical fiber fusion splicer comprising:
   a first microscope configured to observe first and second optical fibers by receiving light emitted from a first light source in a first direction;
   a second microscope configured to observe the first and second optical fibers by receiving light emitted from a second light source in a second direction, the second direction crossing the first direction;
   a fusion splicer configured to fusion-splice an end portion of the first optical fiber and an end portion of the second optical fiber; and
   a controller configured to control the fusion splicer,
   wherein the first microscope is movable in the first direction such that it can perform focus adjustment with respect to the first and second optical fibers,
   wherein the second microscope is immobile in the second direction, and
   wherein the second microscope cannot perform focus adjustment with respect to the first optical fiber and cannot perform focus adjustment with respect to the second optical fiber.

2. The optical fiber fusion splicer according to claim 1, wherein the controller is further configured to:
   determine whether a center position of a core of the first optical fiber is unrecognized from an observation result from the second microscope; and
   detect a center of an outer diameter of the first optical fiber in response to determining that the center position of the first optical fiber is unrecognized.

3. The optical fiber fusion splicer according to claim 2, wherein the controller is further configured to:
   determine whether a center position of a core of the second optical fiber is unrecognized from the observation result from the second microscope; and
   detect a center of an outer diameter of the second optical fiber in response to determining that the center position of the second optical fiber is unrecognized.

4. The optical fiber fusion splicer according to claim 1, wherein the controller is further configured to:
   acquire first and second images, the first image being captured by the first microscope and the second image being captured by the second microscope;
   determine whether a center position of a core of the first optical fiber is unrecognized from the second image; and detect a center of an outer diameter of the first optical fiber from the second image in response to determining that the center position of the first optical fiber is unrecognized.

5. The optical fiber fusion splicer according to claim 4, wherein the controller is further configured to:
   determine whether a center position of a core of the second optical fiber is unrecognized from the second image; and
   detect a center of an outer diameter of the second optical fiber from the second image in response to determining that the center position of the second optical fiber is unrecognized.

6. The optical fiber fusion splicer according to claim 4, wherein the controller is further configured to:
   judge whether the center position of the core of the first optical fiber is recognized from the first image and the second image; and
   determine the center position of the core of the first optical fiber.

7. The optical fiber fusion splicer according to claim 6, wherein the controller is further configured to:
   judge whether a center position of a core of the second optical fiber is recognized from the first image and the second image; and
   determine the center position of the core of the second optical fiber.

8. The optical fiber fusion splicer according to claim 7, wherein the controller is further configured to:
   judge whether the center position of the core of the second optical fiber is a wrong position; and
   detect a center of an outer diameter of the second optical fiber from the second image in response to determining that the center position of the second optical fiber is the wrong position.

9. The optical fiber fusion splicer according to claim 6, wherein the controller is further configured to:
   judge whether the center position of the core of the first optical fiber is a wrong position; and
   detect the center of the outer diameter of the first optical fiber from the second image in response to determining that the center position of the first optical fiber is the wrong position.

10. An optical fiber fusion splicing method using the optical fiber fusion splicer of claim 1, the optical fiber fusion splicing method comprising:
    providing the optical fiber fusion splicer of claim 1;
    observing the first and second optical fibers with the immobile second microscope from the second direction;
    determining center positions of cores of the first and second optical fibers from observation results from the second microscope;
    in response to determining that the center position of the core of the first optical fiber is unrecognized, detecting a center of an outer diameter of the first optical fiber;
    in response to determining that the center position of the core of the second optical fiber is unrecognized, detecting a center of an outer diameter of the second optical fiber;
    adjusting positions of the first and second optical fibers to each other; and
    fusion-splicing the end portions of the first and second optical fibers after adjusting positions of the first and second optical fibers to each other.

* * * * *